Aug. 13, 1963

M. E. SZEKELY

BINARY FULL ADDER UTILIZING INTEGRATED UNIPOLAR TRANSISTORS 3,100,838

Filed June 22, 1960

3 Sheets-Sheet 1

INVENTOR.

MICHAEL E. SZEKELY

BY John V. Regan

ATTORNEY

INVENTOR.
MICHAEL E. SZEKELY
BY John V. Regan
ATTORNEY

INVENTOR.
MICHAEL E. SZEKELY
BY John V. Regan
ATTORNEY

United States Patent Office 3,100,838
Patented Aug. 13, 1963

3,100,838

BINARY FULL ADDER UTILIZING INTEGRATED UNIPOLAR TRANSISTORS

Michael E. Szekely, Belle Mead, N.J., assignor to Radio Corporation of America, a corporation of Delaware Filed June 22, 1960, Ser. No. 37,940
14 Claims. (Cl. 235—176)

An objective of the present invention is to provide a binary adder which is light in weight, small in size and reliable in operation, and which requires very little power.

Another objective of the invention is to provide a binary adder made up of a relatively small number of semiconductor elements which can be integrated into one or two pieces of semiconductor material and which thereby can be marketed as a module.

Another objective of the invention is to provide a topological arrangement of unipolar transistor elements such that all such elements in the sum and carry circuits of a binary adder can be serially connected and integrated into a single piece of semiconductor material. In a circuit of this type, some of the unipolar transistors act as active elements and some as passave elements such as resistors, however, all elements may be identical in structure. Accordingly, a feature of this type of integration is that the manufacturing technique for making the binary adder is relatively simple.

Another objective of the invention is to provide a new and improved inverter circuit made up of unipolar transistors which is especially suitable for use in a binary adder but which is not restricted to this use.

The adder of the invention comprises a first plurality of serially connected unipolar transistors integrated into one piece of semiconductor material for deriving from addend, augend and carry input signals a carry output signal. An inverter circuit receives the carry output and inverts the same. A second plurality of serially connected unipolar transistors is connected in series with the first plurality of unipolar transistors and integrated into the same piece of semiconductor material as the first plurality of unipolar transistors. The second plurality of unipolar transistors derives from the input signals and the inverted carry output signal a sum output signal.

In a preferred form of the invention, the inverter comprises two unipolar transistors connected in series. The transistors are of opposite conductivity type to the transistors which derive the sum and carry output signals. One of the unipolar transistors in the series circuit receives the sum signal and the other receives the carry signal.

The invention is described in greater detail in the drawings described briefly below and in the explanation following the drawing description:

The circuits to be discussed in detail below all include unipolar transistors as active elements. These elements are described in an article by Wallmark and Marcus appearing in the IRE Transactions on Electronic Computers, June 1959, page 98, and elsewhere in the literature. Accordingly, only a brief description is given of the element and its mode of operation.

Figures 1, 2:
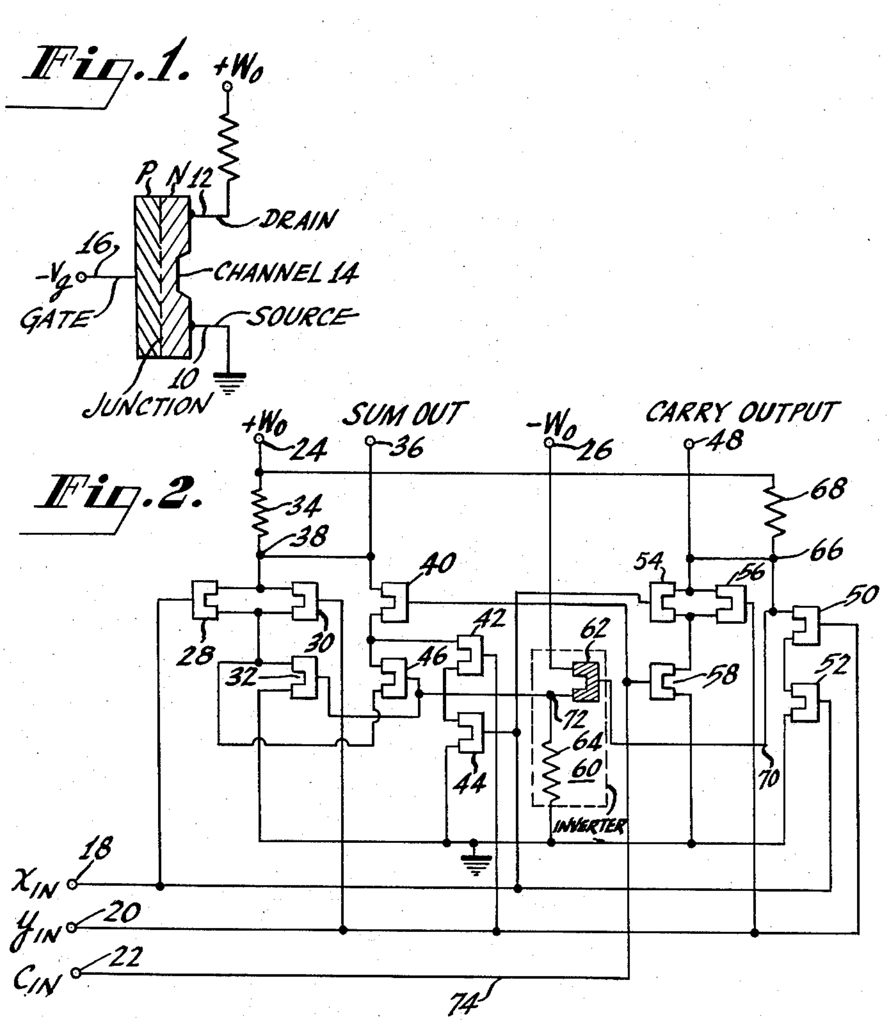
FIG. 1 is a cross-sectional view of a unipolar transistor.
FIG. 2 is a schematic circuit diagram of a full adder circuit according to the present invention.

FIG. 1 is a schematic showing of a unipolar transistor. The body includes a P-type region and an N-type region. Charge carriers (electrons in the present case) flow from the source electrode 10 through the N-type material to the drain electrode 12. The N-type material includes a portion 14 of restricted cross-section known as the channel. Voltages applied to the gate electrode 16 change the effective cross-section of the channel 14 thereby altering its impedance and controlling the current flow from the source to the drain electrode 12. For example, in the transistor illustrated, as the reverse bias on the gate electrode 16 is increased (the gate electrode made more negative), the drain current flow decreases. A family of characteristics of current versus voltage for a typical unipolar transistor appears in FIG. 2 of the article above.

The circuits to be discussed are computer circuits and all operate on binary information. An input representing one binary digit causes the transistor to conduct heavily. An input representing the other binary digit causes the transistor to be substantially cut off. A voltage $V_g$ applied to the gate electrode 16 of sufficient amplitude to drive the unipolar transistor to cut-off is normally known as the "pinch-off" voltage $W_o$. The supply voltage should be equal to or greater than $W_o$ and of opposite sign to $W_o$.

The region of which the channel 14 is formed may be either of N- or P-type material. Transistors of the former type, hereafter termed "N-type" transistors, are shown clear in the other figures of the drawings and transistors of the latter type, hereafter termed "P-type" transistors, are shown cross-hatched in the drawings.

The circuit shown in FIG. 2 is a full adder. The following convention is adopted for this circuit. A binary "zero" input is a voltage sufficient to cut off the transistor, that is, the pinch-off voltage $W_o$ for the transistor. The N-type transistors shown normally have supply voltages equal to $+W_o$ of the order of +15 volts or greater so that the "zero" input for most N-type transistors may be of the order of −15 volts or $-W_o$. A binary "one" input may be of the order of $-W_o/3$ or −5 volts and this permits the transistor to conduct heavily. (Transistors 32 and 46 (at the bottom left of the figure) are designed somewhat differently as is explained in more detail later.) A "zero" output for the N-type transistors of FIG. 2 is of the order of +15 volts and a "one" output for these transistors is of the order of a few volts positive.

Three input voltages are applied to the full adder of FIG. 2. The first is an addend voltage legended $X_{in}$ applied to terminal 18; the second is an augend voltage legended $Y_{in}$ applied to terminal 20; and the third is a carry voltage legended $C_{in}$ applied to terminal 22. The circuit includes a terminal 24 to which a source of operating voltage $+W_o$ for the N-type transistors may be applied and a terminal 26 to which a source of operating voltage $-W_o$ for the P-type transistor may be applied.

A first pair of transistors 28 and 30 are connected in shunt and a third transistor 32 is connected in series with the shunt circuit. These three transistors are connected through a load resistor 34 to terminal 24.

The sum output terminal 36 is connected to junction 38 between the load resistor 34 and transistors 28 and 30. Three transistors 40, 42 and 44 are connected in series between the sum output terminal 36 and ground. A third series circuit between sum output terminal 36 and ground includes transistor 40, transistor 46, and transistor 32. Transistors 32 and 46 are designed to have a pinch-off voltage $-W_0/3$. The reason is that when transistor 62 conducts, the voltage drop across the transistor reduces the value of the negative voltage available to drive transistors 32 and 46 to cut-off.

The second output may be obtained from the circuit at carry output terminal 48. Transistors 50 and 52 are connected in series between terminal 48 and ground. A pair of transistors 54 and 56 are connected in shunt with each other and a third transistor 58 is connected in series with the shunt circuit. The three transistors 54, 56 and 58 are connected between the carry output terminal 48 and ground. The carry output voltage is inverted by a stage 60, shown in a dashed block, and applied as an input to a number of the unipolar transistors in the sum circuit. The specific inverter illustrated consists of a P-type unipolar transistor 62 in series with a resistor 64. The series circuit is connected between terminal 26 and ground.

The truth table for the full adder of FIG. 2 is as follows:

| Inputs | | | Outputs | |
|---|---|---|---|---|
| X | Y | $C_i$ | S | $C_o$ |
| 0 | 0 | 0 | 0 | 0 |
| 1 | 0 | 0 | 1 | 0 |
| 0 | 1 | 0 | 1 | 0 |
| 0 | 0 | 1 | 1 | 0 |
| 1 | 1 | 0 | 0 | 1 |
| 1 | 0 | 1 | 0 | 1 |
| 0 | 1 | 1 | 0 | 1 |
| 1 | 1 | 1 | 1 | 1 |

Put in Boolean terms:

$$S=\overline{X}\overline{Y}C_i+\overline{X}Y\overline{C}_i+X\overline{Y}\overline{C}_i+XYC_i \quad (1)$$

$$C_o=\overline{X}YC_i+X\overline{Y}C_i+XY\overline{C}_i+XYC_i \quad (2)$$

Equations 1 and 2 can be manipulated to give the following:

$$S=(X+Y+C_i)\overline{C}_o+XYC_i \quad (1a)$$

$$C_o=XY+YC_i+XC_i \quad (2a)$$

The circuit of FIG. 2 implements Equations 1*a* and 2*a* above. This can be seen by substituting for the XY and C terms, terms with subscripts which represent the transistors in FIG. 2. For the sum portion of the circuit:

$$S=X_{28}\overline{C}_{o32}+Y_{30}\overline{C}_{o32}+C_{i42}\overline{C}_{o46}\overline{C}_{o32}+C_{i40}Y_{42}X_{44}$$

which may be simplified to $$S=(X_{28}+Y_{30}+C_{i42})C_{o32}+X_{44}Y_{42}C_{i40} \quad (1b)$$

For the carry portion of the circuit:

$$C=X_{52}Y_{50}+Y_{56}C_{i58}+X_{54}C_{i58} \quad (2b)$$

Some examples of the circuit operation for different assumed inputs are as follows. Assume first that the three inputs are all "zero." This means that a voltage equal to the pinch-off voltage or about −15 volts is applied to input terminals 18, 20 and 22. Transistors 50 and 52 are both cut off since −15 volts is applied from terminals 18 and 20 to their gate electrodes. Similarly, transistors 54, 56 and 58 are cut off since a pinch-off voltage is applied from terminals 18, 20 and 22 to their gate electrodes. Thus, a voltage of approximately +15 volts appears at the junction 66 between load resistor 68 and transistor 50. This junction is connected to the carry output terminal 48 so that +15 volts or binary "zero" appears at output terminal 48.

The +15 volts at junction 66 is applied via lead 70 to the gate electrode of transistor 62. This voltage is sufficient to drive transistor 62 to cut-off so that junction 72 between load resistor 64 and transistor 62 is at substantially ground voltage. This voltage is applied to the gate electrodes of transistors 46 and 32 so that the latter are in condition to conduct.

The pinch-off voltage on terminals 18 and 20 is applied to the gate electrodes of transistors 28 and 30 so that these two transistors are cut-off. Input terminal 22 is connected via lead 74 to the gate electrode of transistor 40 so that transistor 40 is cut-off. Transistors 42 and 44 are connected to terminals 20 and 18 respectively so that these two transistors are cut-off. Accordingly, even though transistors 32 and 46 are enabled, there is no conduction through any transistor path between junction 38 and ground and substantially +15 volts (binary "zero") appears at sum output terminal 36.

Assume now that the X input is binary "one" (−5 volts) and the Y and C inputs are each binary "zero" or −15 volts. This should give a sum output of "one" and a carry output of "zero." Referring to FIG. 2, the binary "one" input applied to the gate of transistor 52 enables transistor 52 but since transistor 50 is cut-off, the series circuit does not conduct. In a similar manner transistor 54 is enabled by the binary "one" input but since the transistor 58 in series with it is cut-off, the circuit including transistor 58 and transistor 54 does not conduct. Accordingly, there is no conducting circuit between the carry output terminal 48 and ground and a binary "zero" (+15 volts) appears at the carry output terminal 48.

As already discussed, when the carry output is binary "zero," transistors 32 and 46 are enabled. The binary "one" applied to the gate electrode of transistors 28 enables this transistor so that now both transistors 28 and 32 are enabled and current flows through load resistor 34 and these two transistors. The voltage at junction 38 now drops to a few volts positive and this voltage appears at sum output terminal 36. Thus, a binary "one" appears at the sum output terminal 36.

The last example to be given of the circuit operation is all inputs binary "one." Now transistors 50 and 52 both conduct so that junction 66 drops from +15 volts to a few volts positive and a binary "one" output appears at carry output terminal 48. When a binary "one" appears at the carry output terminal, P-type transistor 62 is rendered conductive and it applied a sufficiently negative voltage to N-type transistors 32 and 46 to cut them off. However, the three binary "one" inputs turn on transistors 40, 42 and 44 so that a conductive path appears between the sum output terminal and ground. Accordingly, the voltage of this terminal drops from +15 volts to a few volts positive and a binary "one" output appears at the sum output terminal 36.

The circuit operation for other inputs is readily traced and is found to give the results shown in the truth table above.

Figure 3:
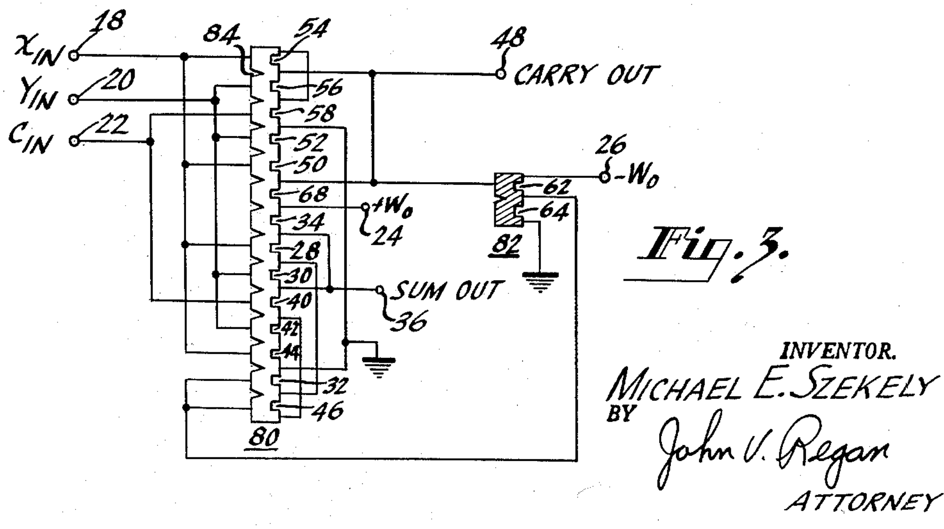
FIG. 3 is the circuit of FIG. 2 with the sum and carry portions of the circuit integrated into a single piece of semiconductor material.

The full adder of FIG. 2 includes 12 N-type unipolar transistors, one P-type unipolar transistor, and three resistors, a total of 16 elements. It has been found possible to integrate this circuit into two pieces of semiconductor material hereafter termed two "sticks." The circuit is shown in FIG. 3. The transistors in the sticks are integrated in series, that is, drain-to-source, source-to-source, or drain-to-drain. All of the N-type transistors and the two load resistors for the sum and carry circuits are integrated into a single stick 80, and the inverter, consisting of the P-type transistor 62 and its load resistor, is in a second stick 82. The fabrication of the integrated transistor assembly, sometimes known at DCUT (direct coupled unipolar transistors) is described in the literature (see the article above and the references quoted therein). The drain of one transistor forms a continuation of the source of the next adjacent transistor or of the drain of the next adjacent transistor. Similarly, the source of one transistor is a continuation of the drain or source of the next transistor. One method of fabrication is to form grooves such as 84 in the P-type material of the gate region of sufficient depth to extend through the junction thereby providing active element-active element isolation. However, the direct connection from source to drain electrode provides the necessary ohmic coupling. Other methods of fabrication are also possible.

It is not necessary to describe the operation of the circuit of FIG. 3 as it is exactly the same as the circuit of FIG. 2. Similar reference numerals have been applied to similar elements. It might be pointed out that the resistors of FIG. 3 are actually transistors to which no gate electrode input signal is applied. The gate may be disconnected as shown in some of the figures or it may be tied to the drain electrode of one of the active unipolar transistors for which the resistor-unipolar transistor serves as a load resistor as shown in FIG. 10. The resistance of the resistor unipolar transistor is, in general, dependent upon the channel cross-section and may be made any practical value desired. However, for a given channel cross-section, the average value of transistor resistance may be decreased by connecting the resistor as shown in FIG. 10. This is advantageous as it increases the circuit speed and may be used in the circuits of FIGS. 2, 3, 6 or 7.

A practical circuit according to FIG. 3 may have the following dimensions. .140″ x .020″ and .04″ x .02″ sticks of .001″ to 0.005″ thickness.

In some applications in which it is desired to incorporate the full adder of FIG. 3 on a micro-miniature wafer .310″ x .310″ x .01″, the single stick of FIG. 3 may be divided into two sticks. In this event the stick is preferably broken between resistors 34 and 68 or at the "source" connection of one resistor.

Figure 4:
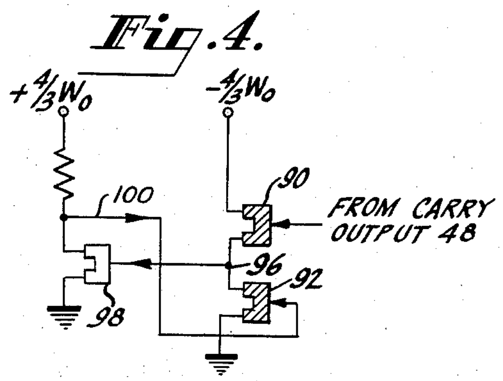
FIG. 4 is a schematic diagram of a preferred type of inverter which may be used in the circuit of FIG. 2.

In the full adder of FIG. 2, the carry output is inverted and applied to some of the stages 32 and 46 of the sum circuits. The inverter shown consists of a unipolar transistor in series with a resistor. The voltage drop across the unipolar transistor (62 in FIG. 2) is such that the transistors 32 and 46 which receive the inverted carry must be designed to have a lower pinch-off voltage ($-W_0/3$) than the other transistors in the sum and carry circuits. This requires that the channel for transistors 32 and 46 be of smaller cross-section than the channels for the other transistors. Other circuits may be used. Another type of inverter is shown in FIG. 4. A full adder using this circuit can employ unipolar transistors which all require the same pinch-off voltage. The circuit includes, rather than a unipolar transistor and resistor, two active unipolar transistors 90 and 92. These are connected in series. The upper transistor 90 receives its input from the carry output terminal 48. The terminal 96 between the two transistors is connected to the gate electrode of one or more transistors in the sum circuits. One such transistor 98 is shown. The output of transistor 98 is connected via feedback connection 100 to the gate electrode of transistor 92. The power supply voltage for transistors 90 and 92 is somewhat higher than that employed in the circuit of FIG. 2. The voltage may, for example, be $-\frac{4}{3}W_0$.

The circuit of FIG. 4 operates as follows. Assume first that the input to the gate electrode of transistor 90 is a binary "zero" or +15 volts. This drives transistor 90 towards cut-off so that the terminal 96 between transistors 90 and 92 is driven in the positive direction, that is, from a negative value towards ground. Terminal 96 is connected to the gate electrode of transistor 98 and the positive going voltage applied to the gate electrode causes transistor 98 to conduct more heavily. When this occurs, the output of transistor 98 is driven in the negative direction, that is, it is driven from a more positive value toward ground. This output is coupled via lead 100 to the gate electrode of transistor 92 and tends to cause transistor 92 to conduct more heavily. Summarizing the operation, the positive voltage applied to transistor 90 causes its impedance to increase and the feedback voltage which results, which is applied to transistor 92, causes the impedance of transistor 92 to decrease. The overall effect then is to drive point 96 toward ground. Neither transistors 90 nor 92 cut-off during the process.

When a binary "one" (a voltage a few volts positive) is applied to the gate electrode of transistor 90, transistor 90 tends to conduct heavily. This makes terminal 96 more negative and this negative voltage applied to the gate electrode of transistor 98 causes the latter to be driven toward cut-off. The feedback voltage which results becomes more positive and this causes transistor 92 to tend to be driven toward cut-off. In summary then, a binary "one" applied to transistor 90 causes the impedance of transistor 90 to decrease and the impedance of transistor 92 to increase so that terminal 96 between the two transistors becomes negative to the extent of about $-W_0$ or $-15$ volts. Again, neither transistor 90 nor transistor 92 is cut-off in the process.

Figure 5:
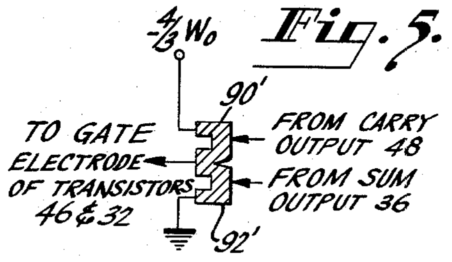
FIG. 5 is an integrated form of the circuit of FIG. 4.

The circuit of FIG. 4 may be integrated as shown in FIG. 5. Similar reference numerals primed are applied to similar elements.

Another possible inverter for the circuit of FIG. 2 (or the one of FIG. 6) is a battery such as shown in FIG. 9. The battery floats and for a circuit like the one of FIG. 2 may have a voltage of about 20 volts. When the carry output of the circuit is binary "zero" (+15 volts), the output voltage of the inverter 60 applied to the gate electrode of transistor 46 will be $-5$ volts or a binary "one" input to that transistor. Similarly, when the carry output is a binary "one" (say +5 volts or less), then the output voltage of the inverter is a binary "zero" or $-15$ volts or more. If an inverter such as shown in FIG. 9 is employed in the circuit of FIG. 2, transistors 46 and 32 may be identical with the other N transistors. In other words, these transistors may have pinch-off voltages of $-W_0$ just like the other N-type transistors in the circuit.

Figure 6:
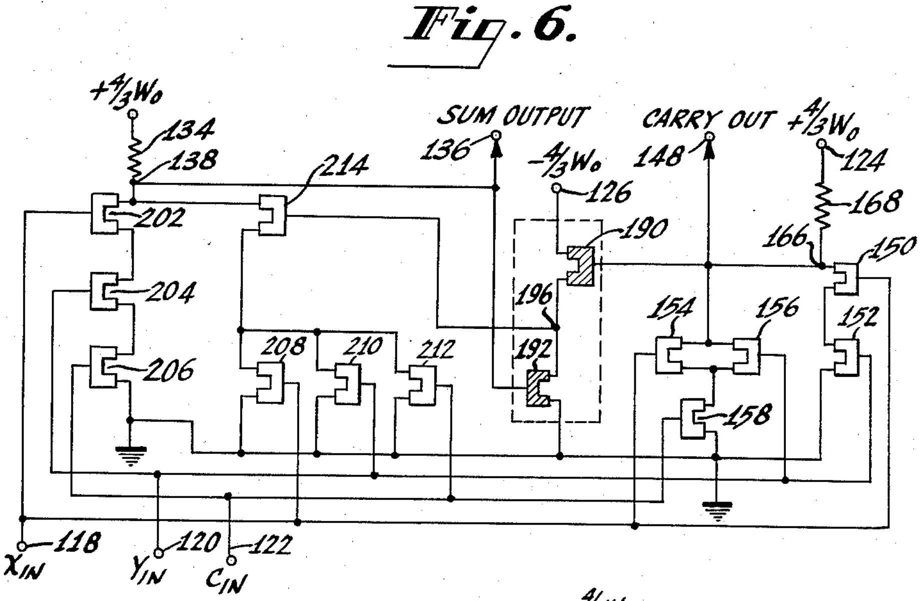
FIG. 6 is a schematic circuit diagram of another form of adder circuit according to the invention.

In the circuit of FIG. 2, a binary "zero" input is $-W_0$ or about $-15$ volts and a binary "one" input is $-W_0/3$ or about $-5$ volts. The circuit of FIG. 6 is the inverse of the one of FIG. 2. In other words, the binary "zero" input is $-W_0/3$ or $-5$ volts and the binary "one" input is $W_0$ or $-15$ volts.

Referring to FIG. 6, the carry output circuits are quite similar to the analogous circuits in FIG. 2 and the same reference numerals plus 100 have been applied. The inversion circuit is similar to the one shown in FIG. 4 and again similar reference numerals plus 100 have been applied. The sum circuits include three transistors 202, 204 and 206 connected in series between the sum output terminal 136 and ground. It also includes three transistors 208, 210 and 212 connected in shunt and the shunt circuit connected in series with a fourth transistor 214. Transistor 214 and the shunt circuit are connected in series between the sum output terminal 136 and ground.

The truth table for the circuit of FIG. 6 is identical to the one for the circuit of FIG. 2. However, it should be remembered that now $-W_0$ represents a binary "one" input and $-W_0/3$ a binary "zero" input. Also, a binary "zero" output is represented by a few volts positive and a binary "one" output by $+W_0$ (+15 volts).

The operation of the circuit of FIG. 6 is as follows. Assume first that the X, Y, and C inputs are all binary "zero." Transistors 150 and 152 conduct so that terminal 166 is a few volts positive and the carry output at terminal 148 is therefore binary "zero." In like manner, transistors 202, 204 and 206 in the sum circuit conduct so that terminal 138 is at a few volts positive and a binary "zero" output appears at sum output terminal 136.

Assume now that the X input is binary "one" and the Y and C inputs are binary "zero." Transistor 154 in the carry circuit is driven to cut-off and transistors 158 and 156 which are connected to the C and Y inputs respectively conduct so that current flows from terminal 166 through transistors 156 and 158. Accordingly, terminal 166 has a voltage of a few volts positive and the carry output is binary "zero." Transistor 190 in the inverter stage receives the binary "zero" output and produces at terminal 196 a binary "one" output. This binary "one" output is applied to transistor 214 and drives this transistor to cut-off. Accordingly, no current flows from terminal 138 through transistor 214. Transistor 202 is also driven to cut-off by the binary "one" input. Accordingly, no current flows through transistors 202, 204 and 206. The result is that terminal 138 becomes positive to the extent of approximately $W_0$ or +15 volts and a binary "one" appears at terminal 136.

Assume now that the X and Y inputs are both binary "one" and the C input is a binary "zero." Transistors 150 and 152 which receive the X and Y inputs are both driven to cut-off. Transistors 154 and 156 which also receive the X and Y inputs are both driven to cut-off. Accordingly, there is no conducting path from terminal 166 to ground and the carry output at terminal 148 approaches $W_0$ or binary "one." The binary "one" output is inverted by inverter stage 192 to a binary "zero" and transistor 214 is enabled. Transistor 212 which is in series with transistor 214 also conducts in response to the binary "zero" input thereto from terminal 122. Accordingly, there is a conducting path from terminal 138 through transistors 214 and 212 and terminal 138 is at a voltage of a few volts positive. The sum output terminal therefore represents binary "zero."

It is believed to be unnecessary to give added examples. This circuit may be traced for any combination of inputs to produce the desired full adder outputs, as given in the truth table above.

Figure 7:
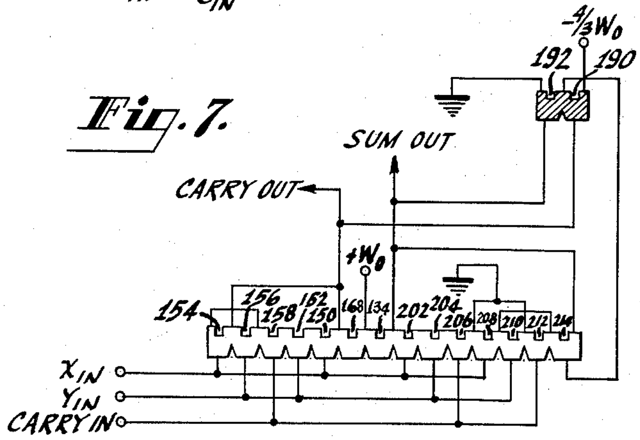
FIG. 7 is the circuit of FIG. 6 with the sum and carry portions integrated into a single piece of semiconductive material.
Figures 8, 9, 10, 11:
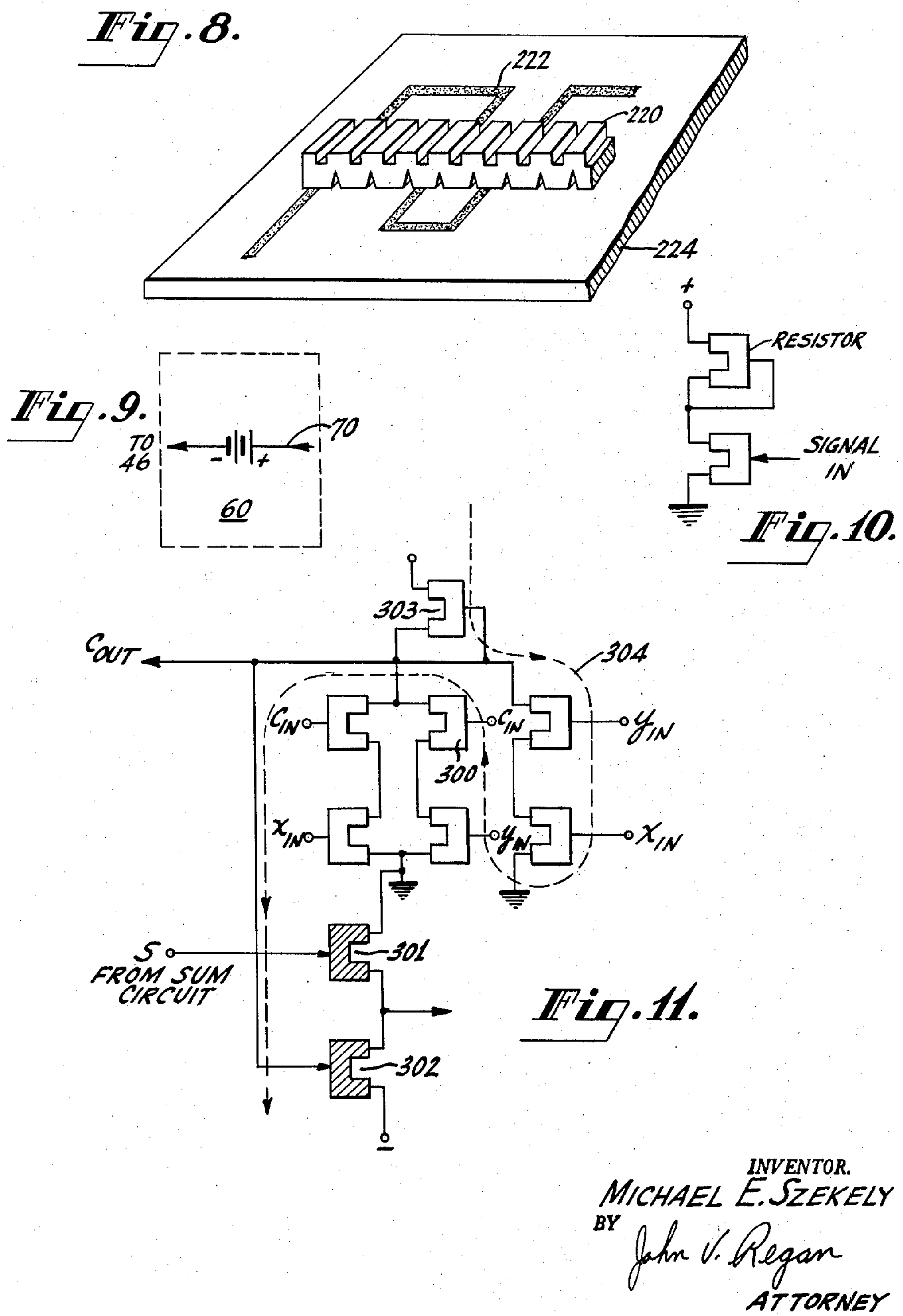
FIG. 8 is a schematic showing of a way in which printed circuit windings may be connected to various electrodes of an integrated adder.
FIG. 9 is another form of inverter which may be used in the full adders of the invention.
FIG. 10 is a schematic diagram of a modified unipolar transistor-resistor circuit.
FIG. 11 is a schematic diagram of the carry circuit of a full adder integrated with the inverter circuit.

The circuit of FIG. 6 may be integrated into two sticks in the manner shown in FIG. 7. Like reference numerals have been applied to like circuit elements so that no further explanation is deemed necessary.

In the circuits discussed so far, the sum and carry circuits in the full adder are integrated into one stick of semiconductor material and the inverter for the carry output signal is a separate circuit. It is possible to integrate the inverter circuit into the same piece of semiconductor material as the carry circuit. This is shown in FIG. 11. Note that there is one more unipolar transistor, namely transistor 300, which is used. The operation of the circuit is the same as those already described and may be defined by the Boolean equation:

$$C_0=C_iX+C_iY+XY$$

The topology is such that inverter 301, 302 (which is the same as the inverter of FIGS. 4 and 5) appears at the end of the stick. The integration of the transistors and resistor 303 is schematically illustrated by dashed arrow 304 which indicates the manner in which the transistors are serially connected.

In order to manufacture all unipolar elements on a single stick, a masking technique is employed. First the end on which the inverter is to be located of a stick of intrinsic material is masked and the N-type transistors are formed by diffusion and doping techniques. Then the N-type transistors are masked and the P-type are formed at the end of the stick by similar techniques.

FIG. 8 is an abbreviated showing of how the integrated circuit may appear in practical form. The direct coupled transistors are shown at 220. The gate portions of the transistors are interconnected in any desired manner by a printed circuit shown at 222. The printed circuit is on an insulating supporting base shown at 224. The source and drain electrodes of the transistors may be interconnected in a similar manner by a second printed circuit on a second insulated backing neither of which is shown in the figure. The completed circuit may take the form of a sandwich consisting of a first printed circuit, the direct coupled unipolar transistors, and a second printed circuit, in that order.

In the claims which follow, the expression "serially connected" unipolar transistors refers to the connection between transistors source electrode to drain electrode, drain electrode to drain electrode, or source electrode to source electrode. For example, in FIGURES 2 and 3, transistors 50 and 52 are serially connected source electrode to drain electrode, respectively; transistors 52 and 58 are serially connected source electrode to source electrode.

I claim:

1. In combination, a first terminal to which an operating voltage may be applied and a second terminal at a point of reference potential; a first circuit extending between said terminals comprising first, second and third unipolar transistors connected in series source electrode to drain electrode, each said transistor having a gate electrode to which a control signal may be applied, and said second and third transistor receiving the same control signal; a second circuit extending between said terminals comprising said first unipolar transistor and fourth and fifth unipolar transistors connected in series source electrode to drain electrode, each said first fourth and fifth transistor each having a gate electrode to which a different control may be applied; and a third circuit extending between said terminals comprising sixth and seventh unipolar transistors in parallel and said third unipolar transistor in series with the parallel combination, the drain electrode of said third unipolar transistor being connected to the common source electrode connection of said parallel connected transistors, said sixth and seventh unipolar transistors each having a gate electrode to which a different control signal may be applied whereby an output signal appears at said first terminal when said first and second and third unipolar transistors conduct, or when first, third and fourth unipolar transistors conduct, or when said fifth or sixth and seventh unipolar transistors conduct.

2. In the combination as set forth in claim 1, said unipolar transistors being integrated into a single piece of semiconductor material and serially connected in the following order: second, third, fifth, fourth, first, seventh and sixth.

3. In combination, a first terminal to which an operating voltage may be applied, and a second terminal at a point of reference potential; a first circuit extending between the terminals comprising first and second unipolar transistors connected in series source electrode to drain electrode, each said transistor receiving a different control signal at its gate electrode; and a second circuit extending between the terminals comprising third and fourth unipolar transistors connected in parallel and a fifth unipolar transistor in series with the parallel unipolar transistor combination, the drain electrode of said fifth transistor being connected to the common source electrode connection of the parallel connected transistors, and each said third, fourth and fifth transistors receiving a different control signal at its gate electrode whereby an output signal appears at said first terminal when said first and second unipolar transistors conduct, or when the third or fourth and fifth unipolar transistors conduct.

4. In the combination as set forth in claim 3, said unipolar transistors being integrated into a single piece of semiconductor material and serially connected in the following order; first, second, fifth, fourth, third.

5. In combination, a terminal to which an operating voltage may be applied, and a second terminal at a point of reference potential; a first circuit extending between said terminals comprising first, second and third unipolar transistors connected in series source electrode to drain electrode, each said transistor receiving a different control signal at its gate electrode; a second circuit extending between said terminals comprising fourth and fifth unipolar transistors connected in series source electrode to drain electrode; and a third circuit comprising sixth and seventh unipolar transistors connected in parallel across said fifth unipolar transistor, the drain electrode of said fifth transistor being connected to the source electrode connection of the parallel connected transistors, and said fourth, fifth, sixth and seventh transistors each receiving a different control signal at its gate electrode whereby an output signal appears at first terminal when said first, second and third unipolar transistors conduct or when said fifth or sixth or seventh and fourth transistors conduct.

6. In the combination as set forth in claim 5, said unipolar transistors being integrated into a single piece of semiconductor material and serially connected in the following order; first, second, third, fifth, sixth, seventh and fourth.

7. In combination, a first terminal to which an operating voltage may be applied, and a second terminal at a point of reference potential; a first circuit extending between the terminals comprising first and second unipolar transistors connected in series source electrode to drain electrode, one transistor receiving a carry signal at its gate electrode and the other transistor receiving an addend signal at its gate electrode; a second circuit extending between the terminals comprising third and fourth unipolar transistors connected in series source electrode to drain electrode, one of said third and fourth unipolar transistors receiving said carry signal at its gate electrode and the other receiving an augend signal at its gate electrode; and a third circuit extending between said terminals comprising fifth and sixth unipolar transistors connected in series source electrode to drain electrode, one of said fifth and sixth unipolar transistors receiving said addend signal at its gate electrode and the other receiving said augend signal at its gate electrode, whereby an output signal appears at said first terminal when said first and second unipolar transistors conduct, or when the third or fourth unipolar transistors conduct, or when said fifth and sixth unipolar transistors conduct.

8. In the combination as set forth in claim 7, said unipolar transistors being integrated into a single piece of semiconductor material and serially connected in the following order: first, second, fourth, third, fifth, sixth.

9. In the combination as set forth in claim 8, further including two additional unipolar transistors of opposite conductivity type to the first six unipolar transistors integrated into the same piece of semiconductor material as said six transistors and connected to said sixth unipolar transistor.

10. In combination, a pair of unipolar transistors connected in series source to drain, one serving as an active element and the other as a load resistor, the gate electrode of said load resistor transistor being connected to said common source-drain connection, and the gate electrode of the other transistor serving as a signal input terminal.

11. A full adder comprising a first plurality of serially connected unipolar transistors integrated into one piece of semiconductor material for deriving from addend, augend and carry input signals applied to the gate electrodes thereof a carry output signal; a circuit comprising a battery to which said carry output signal is applied for inverting said carry output signal; and a second plurality of serially connected unipolar transistors in series with the first plurality of unipolar transistors and integrated into one piece of semiconductor material for deriving from said input signals and the inverted carry output signal applied to the gate electrodes thereof, a sum output signal.

12. A full adder comprising a first plurality of serially connected unipolar transistors integrated into one piece of semiconductor material for deriving from addend, augend and carry input signals applied to the gate electrodes thereof a carry output signal; a circuit to which said carry output signal is applied for inverting said carry output signal, said circuit comprising two unipolar transistors in series, one an active element to which the carry output signal is applied and the other acting as a resistor, said unipolar transistors being of opposite conductivity type to the unipolar transistors which derive the carry output signal; and a second plurality of serially connected unipolar transistors in series with the first plurality of unipolar transistors and integrated into one pipe of semiconductor material for deriving from said input signals and the inverted carry output signal applied to the gate electrodes thereof, a sum output signal.

13. A full adder comprising a first plurality of serially connected unipolar transistors integrated into one piece of semiconductor material for deriving from addend, augend and carry input signals applied to the gate electrodes thereof a carry output signal; a circuit to which said carry output signal is applied for inverting said carry output signal, said circuit comprising two unipolar transistors in series and of opposite conductivity type than the unipolar transistors which derive the carry output signal, means for applying the carry output signal to the gate electrode of one of the transistors, and means for applying the sum signal to the gate electrode of the other transistor; and a second plurality of serially connected unipolar transistors in series with the first plurality of unipolar transistors and integrated into one piece of semiconductor material for deriving from said input signals and the inverted carry output signal applied to the gate electrodes thereof, a sum output signal.

14. A full adder comprising six serially connected unipolar transistors, five acting as active elements and one as a resistor, integrated into one piece of semiconductor material, for deriving from input addend, augend and carry signals a carry output signal, said unipolar transistor acting as a resistor being connected at its source electrode to the drain electrode of one of the other five transistors and at its gate electrode to said common source drain connection; eight serially connected unipolar transistors, seven acting as active elements and one as a resistor, in series with the six unipolar transistors and integrated into one piece of semiconductor material for deriving from said input signals and an inverted carry output signal a sum output signal; and an inverter for producing said inverted carry input signal, said inverter comprising a pair of unipolar transistors connected in series drain electrode-to-source electrode between an operating voltage source and a point of reference potential, one of said pair of transistors connected at its gate electrode to receive said carry output signal, the other of said pair of transistors connected at its gate electrode to receive the sum output signal, said inverter producing said inverted carry output signal at the common source-drain electrode connection between said two transistors.

References Cited in the file of this patent

UNITED STATES PATENTS

| | | |
|---|---|---|
| 2,891,172 | Bruce et al. | June 16, 1959 |
| 2,899,133 | Tryon | Aug. 11, 1959 |
| 2,927,733 | Campbell | Mar. 8, 1960 |
| 2,962,604 | Brittain | Nov. 29, 1960 |
| 2,971,696 | Henle | Feb. 14, 1961 |

OTHER REFERENCES

Wallmark and Marcus: "Integrated Devices Using Unipolar Transistor Logic" (IRE Transactions on Electronic Computers, June 1959), pp. 98 to 105.